United States Patent [19]

Siems

[11] Patent Number: 5,342,993
[45] Date of Patent: Aug. 30, 1994

[54] WEATHER-PROOF FLOOR OUTLET AND METHOD

[76] Inventor: Steven L. Siems, 1491 SW. 21st Ave., Ft. Lauderdale, Fla. 33314

[21] Appl. No.: 12

[22] Filed: Jan. 4, 1993

[51] Int. Cl.$^5$ .............................................. H02G 3/12
[52] U.S. Cl. ....................................... 174/48; 439/131
[58] Field of Search .................... 174/48; 439/131; 220/3.3, 3.4, 3.5, 3.6

[56] References Cited

U.S. PATENT DOCUMENTS

| | | | |
|---|---|---|---|
| 3,131,512 | 5/1964 | MacLeod, Jr. | 220/313 X |
| 3,622,684 | 11/1971 | Press | 174/48 |
| 3,972,579 | 8/1976 | Kohaut | 439/131 |
| 3,993,070 | 11/1976 | Dunn et al. | 312/320 |
| 4,984,982 | 1/1991 | Brownlie et al. | 439/131 |
| 5,023,396 | 6/1991 | Bartee et al. | 174/48 |
| 5,122,069 | 6/1992 | Brownlee et al. | 439/131 |

*Primary Examiner*—Leo P. Picard
*Assistant Examiner*—David Tone
*Attorney, Agent, or Firm*—Oltman and Flynn

[57] ABSTRACT

An electric outlet apparatus for outdoor use includes a housing having a top portion and an opening in the top portion, a receptacle panel structure having a first face and including a receptacle circuit, a receptacle mounted in the first face of the receptacle panel structure, a mechanism for movably connecting the panel to the housing so that the panel can move between a position wherein the panel first face is directed essentially downward inside the housing and an open position wherein the panel extends out of the top opening, and a substantially air tight compartment defined below the first face of the receptacle panel structure for preventing any water collected within the housing from rising to meet the receptacle panel structure. The housing also preferably includes a trap door adjacent to the receptacle panel structure for keeping rain out when the trap door is closed and for receiving a plug and cord when the trap door is open. A method of opening the apparatus includes the steps of moving tile receptacle panel structure upward relative to the housing, and pivoting one end of the receptacle panel structure upward to provide access to the receptacle.

12 Claims, 2 Drawing Sheets

WEATHER-PROOF FLOOR OUTLET AND METHOD

BACKGROUND OF THE INVENTION

1. Field of the Invention

The present invention relates generally to the field of electric outlets for cord plugs, and more specifically to a weather-proof outlet for patios, yards and other outdoor uses, including an outlet housing for mounting in the ground or in a floor, having a wire receiving port at one end and having a cover panel also forming the top of a wiring box which extends down into one end of the housing, and having a plug receptacle panel forming the bottom of the wiring box and having two plug receptacles mounted in the panel, the wiring box having a fulcrum structure at a first end with axle bolts protruding into vertical slots in opposing arm members within the housing, so that the receptacle panel can be lifted into an open position by sliding the wiring box vertically upward along the slots to a freed, pivotable position, and then pivoting the second end of the wiring box upward on the axle bolts to expose to the receptacles and permit plugs to be inserted or removed, and so that the receptacle panel can be lowered into a closed position by pivoting the second end of the wiring box until the box is in a horizontal position, and then sliding the box down along the slots and into the housing, so that the cover panel rests against the top edges of the housing, the housing having a cord port adjacent the cover panel thorough which a plug and cord can be inserted, the cord port having a spring-biased trap door to keep out rain when not in use, the fulcrum structure together with the housing forming a compartment below the receptacle panel which traps air and prevents water from rising to the level of the receptacles.

2. Description of the Prior Art

There have long been electric outlets for mounting in floors so that they are inconspicuous and out of the way. A problem with these outlets has been that they cannot be used outdoors such as in patios, and other useful locations. Rain water would easily enter these outlets and cause electrical shorts.

An example is Bartee, U.S. Pat. No. 5,023,396, issued on Jun. 11, 1991, disclosing a pop-up floor outlet. A base frame in the form of an elongate box is inserted into the floor, and contains a spring-mounted, vertical panel member with two plug receptacles on a panel side face. The vertical panel is attached to the housing lid which pops up with the panel when the receptacles are to be used. A problem with Bartee is that the panel must be extended and the receptacles exposed to the weather when the outlet is in use.

Brownlie, U.S. Pat. No. 4,984,982, issued on Jan. 15, 1991, and U.S. Pat. No. 5,122,069, issued on Jun. 16, 1992, teaches another retractable floor outlet. Brownlie includes a housing recessed into the floor, an axle extending across the housing, and a vertically suspended panel pivotally joined to the axle. Receptacles are provided on one of the panel faces, and a housing top wall is perpendicularly attached to the panel. To use the receptacles, the panel and top wall are pivoted on the axle so that they rise to expose the receptacles for use. A plug is then inserted and the plug cord is fit through a notch in the top wall. Then the panel and top wall are lowered to their original closed position. A problem with Brownlie is that rain could easily enter through the cord notch and flood the housing.

Dunn, U.S. Pat. No. 3,992,070, issued on Nov. 16, 1976, discloses a lockable flip-up instrument panel for use on construction equipment. Dunn includes a box-shaped housing having a top wall hinged along its back edge and an instrument panel vertically attached to the top wall lower surface. The instruments are directed toward the front of the housing so that lifting the top wall on the hinges provides access to the instruments. The top wall is connected by linkages to a lever on a side wall of the housing, for lifting the top wall. The top wall has edges which overhang the housing to keep out rain. A problem with the Dunn design, if used for an outdoor electric outlet, is that the top wall would have to remain at least partly open to let a cord enter the housing and reach a receptacle. Rain could therefore enter and flood the housing.

Press, U.S. Pat. No. 3,622,684, issued on Nov. 23, 1971, teaches a rotatable floor receptacle mounting unit. A mounting ring is secured over a recess in a floor, and a disk member is rotatably mounted on an axle extending diametrically across the ring. A receptacle box is attached to one face of the disk, so that rotating the disk to a position where the box face is on top provides access to the receptacles. Rotating the disk so that the box is on the underside of the disk conceals the box within the floor recess. A problem with Press is that the receptacle box must be rotated up for use, so that the receptacles and any plug are exposed to rain.

It is thus an object of the present invention to provide a receptacle panel and mounting structure assembly which permits the receptacle panel to receive cord plugs in a closed position, sheltered from the weather.

It is another object of the present invention to provide such an assembly which prevents any water accumulated in the structure from reaching the receptacle panel by trapping air in a compartment below the panel, so that the air would have to be compressed for the water to rise into the compartment.

It is still another object of the present invention to provide such an assembly which is essentially flush with the floor or ground when in the closed position.

It is finally an object of the present invention to provide such an assembly which is simple and reliable in design, compact, and inexpensive to manufacture.

SUMMARY OF THE INVENTION

The present invention accomplishes the above-stated objectives, as well as others, as may be determined by a fair reading and interpretation of the entire specification.

An electric outlet apparatus is provided for outdoor use, including a housing having a top portion and an opening in the top portion, a receptacle panel structure having a first face and including a receptacle circuit, a receptacle mounted in the first face of the receptacle panel structure, a mechanism for movably connecting the panel to the housing so that the panel can move between a position wherein the panel first face is directed essentially downward inside the housing and an open position wherein the panel extends out of the top opening, and a substantially air tight compartment defined below the first face of the receptacle panel structure for preventing any water collected within the housing from rising to meet the receptacle panel structure. The housing preferably includes a bottom wall and four side walls. The housing also preferably includes a trap door adjacent to the receptacle panel structure for keeping rain out when the trap door is closed and for receiving a plug and cord when the trap door is open. The apparatus also preferably includes an axle extending from the receptacle panel structure and a support member attached within the housing, having a vertical slot into which the axle extends, for permitting the receptacle panel structure to slide vertically upward. The support member is preferably positioned near one end of the receptacle panel structure so that the receptacle panel structure can pivot upward on the axle to provide access to the receptacle. The apparatus also preferably includes a circuit breaking mechanism within the receptacle circuit which opens the receptacle circuit when the receptacle panel structure is opened, to protect the apparatus user, and closes the receptacle circuit when the receptacle panel structure is closed. The circuit breaking mechanism preferably includes two contact members, each having a bolt port, and a latch bolt extending through each contact member bolt port. The housing optionally includes a bottom portion and a recess in the bottom portion for collecting rain water entering the housing. A drain hole is provided in the bottom portion.

A method of opening the apparatus is also provided, including the steps of moving the receptacle panel structure upward relative to the housing, and pivoting one end of the receptacle panel structure upward to provide access to the receptacle.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
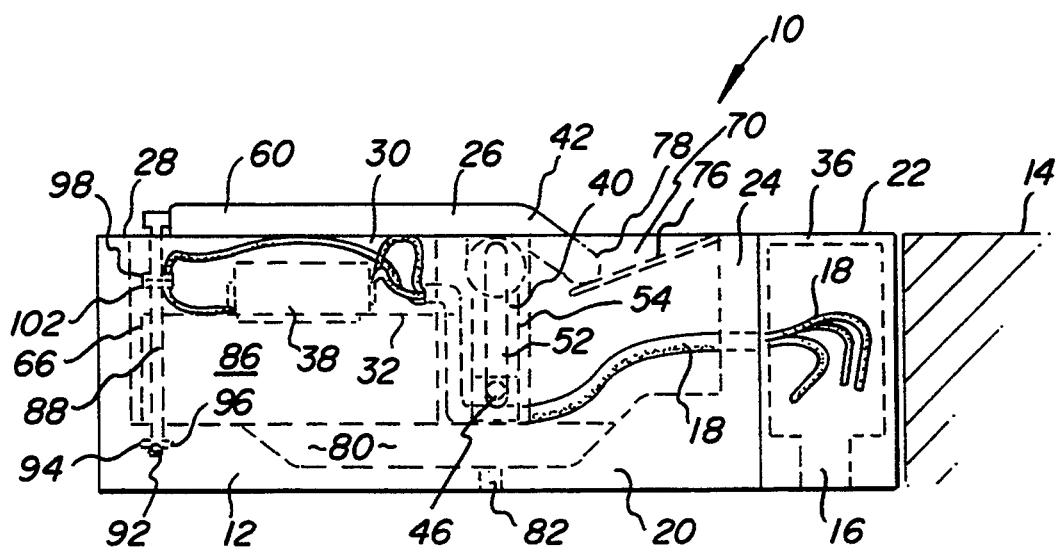
FIG. 1 is a side view of the inventive outlet assembly in the closed position, with interior parts shown in broken lines.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figure 2:
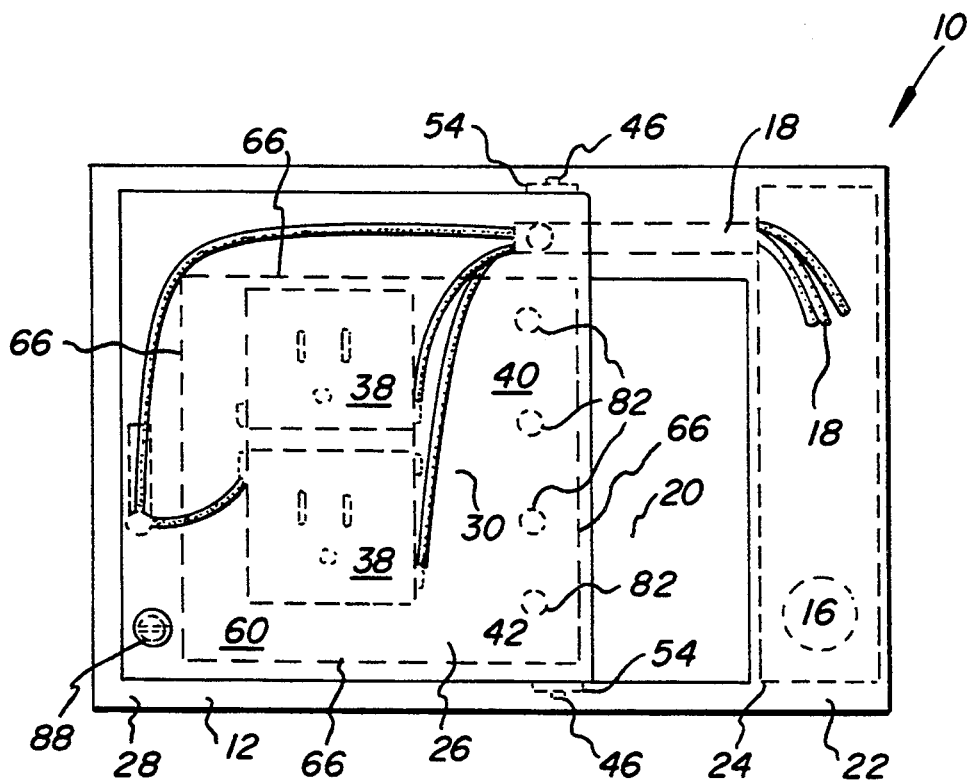
FIG. 2 is a top view of the inventive outlet assembly in the closed position, with interior parts shown in broken lines.

Referring to FIGS. 1 and 2, a weather-proof electric outlet assembly 10 is disclosed for use in patios, yards and other outdoor locations. Assembly 10 includes an outlet housing 12 for mounting in a recess in the ground or floor 14. A wire port 16 is provided for receptacle wire 18 in bottom wall 20 at housing first end 22, to which a conduit (not shown) can be attached. Wire port 16 is divided from the rest of housing 12 by a dividing wall 24 and is covered by a top wall 36. A cover panel 26 fits over the second end 28 of housing 12, and also forms the top of a wiring box 30. Box 30 extends down into the second end 28 of housing 12, and a plug receptacle panel 32 having two plug receptacles 38 on its lower surface forms the bottom of box 30. Box 30 has a fulcrum structure 40 at a first box end 42 and includes a pivot pin 46. Pivot pin 46 protrudes into vertical slots 52 in arm members 54 attached to the bottom wall 20 of housing 12.

Housing 12 has a cord port 70 adjacent to cover panel 26 through which a plug 64 and cord 74 can be inserted. A spring-biased or resilient trap door 76 is provided on cord port 70 to keep out rain when assembly 10 is not in use. Trap door 76 rests against a lip 78 protruding from cover panel 26.

A recess 80 is preferably provided in the upper surface of bottom wall 20 for collecting any water entering housing 12. Several drain holes 82 are provided in recess 80 to permit water to escape from housing 12 into the ground.

A unique feature of this invention is that fulcrum structure 40, together with housing side walls 66, form an air-tight compartment 86 below receptacle panel 32. Compartment 86 traps air thus and prevents water which may accumulate in recess 80 from rising within compartment 80 to the level of receptacles 38. For the water to rise in compartment 86, it would have to compress the trapped air.

A safety feature is preferably provided for breaking the circuit leading to receptacles 38 when assembly 10 is opened. A latch bolt 88 preferably extends vertically through second box end 60 into a hole 92 in housing bottom panel 20. A pin 94 extends through latch bolt 88, so that rotating latch bolt 88 moves pin 94 into a locking slot 96 in hole 92. Two spring-loaded washer contacts 98 and 102 surround latch bolt 88, and receptacle wire 18 connects to one washer contact 98 and then to the other washer contact 102. In this way, contact between washer contacts 98 and 102 completes the receptacle circuit. When assembly 10 is to be opened, latch bolt 88 must first be axially rotated to free pin 94 from locking slot 96. This action also causes washer contacts 98 and 102 to spring apart and break the receptacle circuit. When assembly 10 is closed, latch bolt 88 is again rotated to engage pin 94 in slot 96, which also brings washer contacts 98 and 102 back together.

METHOD

Figure 3:
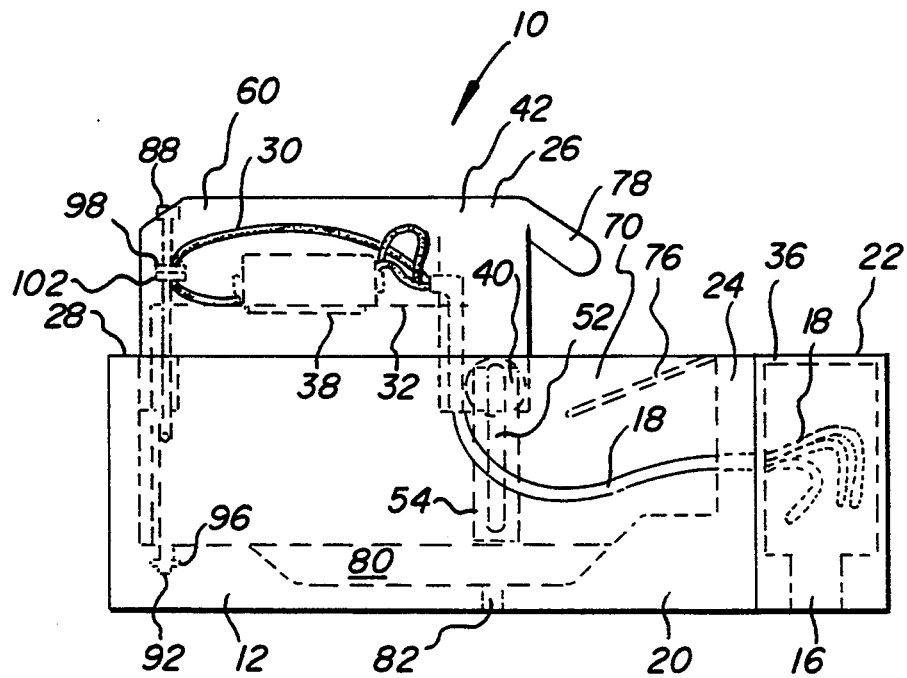
FIG. 3 is a side view as in FIG. 1, except that the wiring box is extended vertically upward in the intermediate position between open and closed.
Figure 4:
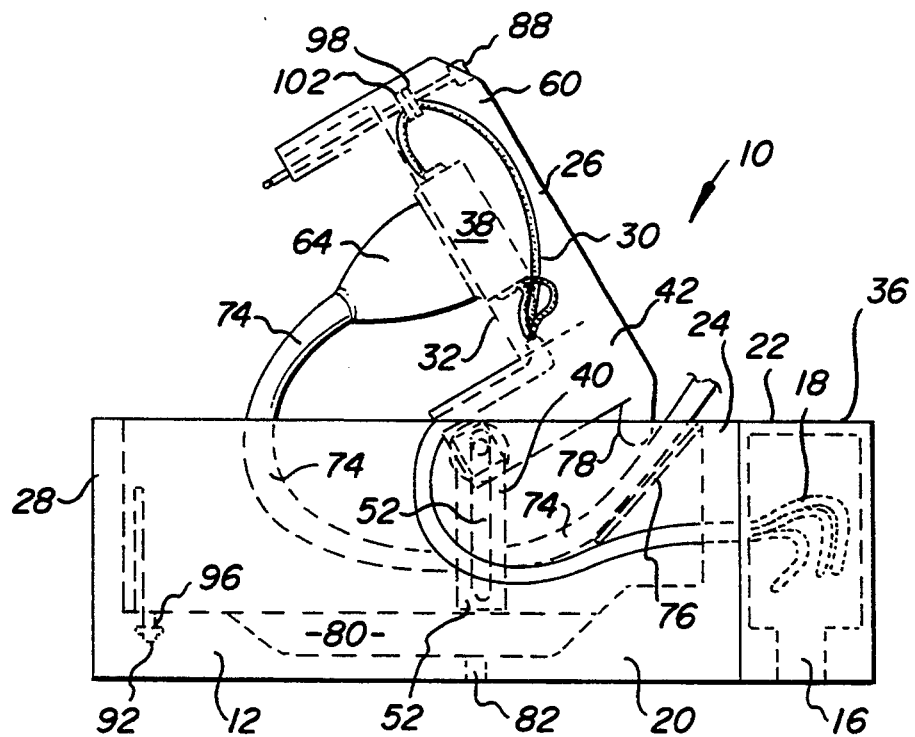
FIG. 4 is a side view as in FIG. 3, except that the wiring box is pivoted into the open position to provide receptacle access. A cord and plug are shown inserted into a receptacle.

A method of practicing the invention is also provided, which includes the following steps. Wiring box 30 is lifted into an open position for access to receptacles 38 by sliding box 30 vertically upward along slots 52 to a freed, pivotable position. See FIG. 3. Then the second box end 60 of box 30 is pivoted upward on pivot pin 46 to expose receptacles 38 and permit plugs 64 to be inserted or removed. See FIG. 4.

Wiring box 30 is lowered into a closed position by pivoting second box end 60 downward until box 30 is in an essentially horizontal position. See FIG. 3. Then box 30 is slid down arm members 54 along slots 52 and into housing 12, so that cover panel 26 rests against the top edges of housing 12 side walls 66. See FIG. 1.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An electric outlet apparatus for outdoor use, comprising:
   a housing having a top portion and an opening in said top portion,
   a receptacle panel structure having a first face and including a receptacle circuit,
   a receptacle mounted in said first face of said receptacle panel structure,
   means for movably connecting said panel to said housing so that said panel can move between a position wherein said panel first face is directed essentially downward inside said housing and an open position wherein said panel extends out of the top opening,
   a substantially air tight compartment defined below said first face of said receptacle panel structure for preventing water collected within said housing from rising to meet said receptacle panel structure.

2. An apparatus according to claim 1, wherein said housing comprises a bottom wall and four side walls.

3. An apparatus according to claim 1, wherein said housing comprises a trap door adjacent to said receptacle panel structure for keeping rain out when said trap door is closed and for receiving a plug and cord when said trap door is open.

4. An apparatus according to claim 1, additionally comprising axle means extending from said receptacle panel structure and a support member attached within said housing, having a vertical slot into which said axle means extends, for permitting said receptacle panel structure to slide vertically upward.

5. An apparatus according to claim 4, wherein said support member is positioned near one end of said receptacle panel structure so that said receptacle panel structure can pivot upward on said axle means to provide access to said receptacle.

6. An apparatus according to claim 1, additionally comprising circuit breaking means within said receptacle circuit which opens said receptacle circuit when said receptacle panel structure is opened, to protect the apparatus user, and closes said receptacle circuit when said receptacle panel structure is closed.

7. An apparatus according to claim 6, wherein said circuit breaking means comprises two contact members each having a bolt port and a latch bolt extending through each said contact member bolt port.

8. An apparatus according to claim 1, wherein said housing comprises a bottom portion and a recess in said bottom portion for collecting rain water entering said housing.

9. An apparatus according to claim 8, wherein a drain hole is provided in said bottom portion.

10. An electric outlet apparatus for outdoor use, comprising:
    a housing having a top portion and an opening in said top portion,
    a receptacle panel structure having a first face and including a receptacle circuits
    a receptacle mounted in said first face of said receptacle panel structure,
    means for movably connecting said panel to said housing so that said panel can move between a position wherein said panel first face is directed essentially downward inside said housing and an open position wherein said panel extends out of the top opening,
    axle means extending from said receptacle panel structure and a support member attached within said housing, having a vertical slot into which said axle means extends, for permitting said receptacle panel structure to slide vertically upward, wherein said support member is positioned near one end of said receptacle panel structure so that said receptacle panel structure can pivot upward on said axle means to provide access to said receptacle.

11. A method of opening an apparatus as in claim 1, comprising the steps of:
    moving said receptacle panel structure upward relative to said housing,
    pivoting one end of said receptacle panel structure upward to provide access to said receptacle.

12. A method of opening an apparatus as in claim 10, comprising the steps of:
    moving said receptacle panel structure upward relative to said housing,
    pivoting one end of said receptacle panel structure upward to provide access to said receptacle.

* * * * *